Feb. 2, 1965
A. RIOS
3,168,224
DRIP FEED DEVICE
Original Filed March 6, 1961
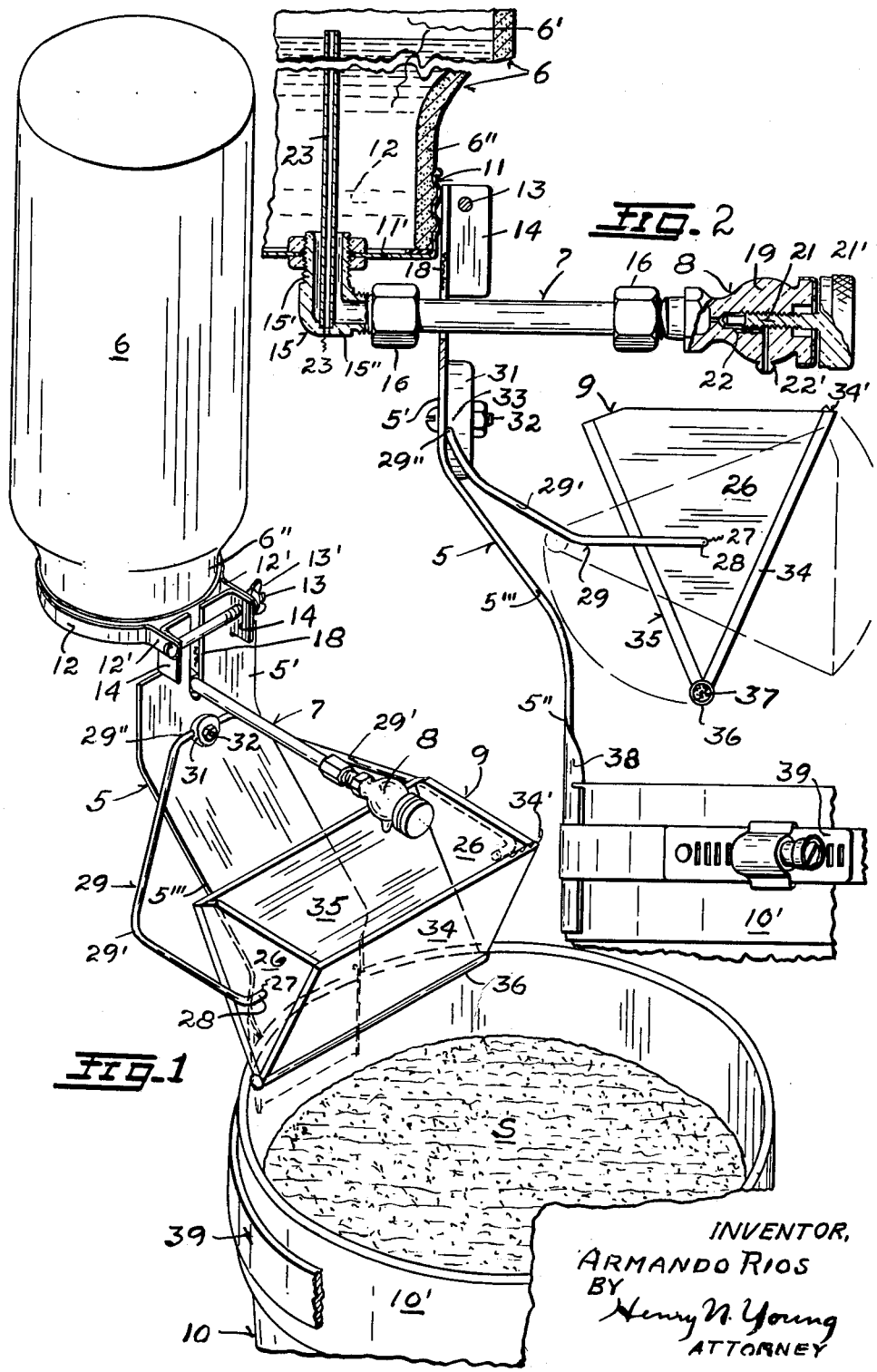
INVENTOR,
ARMANDO RIOS
BY
Henry N. Young
ATTORNEY

United States Patent Office 3,168,224
Patented Feb. 2, 1965

3,168,224
DRIP FEED DEVICE
Armando Rios, 1926 88th Ave., Oakland 21, Calif.
Continuation of application Ser. No. 93,573, Mar. 6, 1961.
This application Aug. 12, 1963, Ser. No. 302,764
3 Claims. (Cl. 222—181)

The invention relates to a liquid-delivery device which utilizes a gravitally self-righting tilt basin which is designed and mounted for its alternate disposal to receive and discharge successive like charges of liquid accumulated in the basin at a constant flow rate from a source of the liquid at an automatically timed frequency determined entirely by the rate at which the liquid is supplied, and this application comprises a continuation of my prior application Ser. No. 93,573, now abandoned, which was filed on March 6, 1961.

The present device has been particularly designed and developed for use in the automatic and periodic watering of live plants, and a primary present object is to provide a liquid-delivery device of the character described which is particularly arranged and adapted for its cooperative installation and use for intermittent and adjustably timed plant-watering operations.

Another object is to provide a device of the character described which is particularly arranged for its operative installation in unitary association with individual plant-growing containers such as indoor or outdoor plant boxes and flower pots.

A further object is to provide a particularly simple and effective structure and mounting for the self-righting tilt basin of the device.

An added object is to provide a unitary assembly of the character described in which the drip source comprises a refillable liquid reservoir for gravitally supplying a constant liquid stream to an adjustable drip faucet or valve discharging into the tilt basin as the liquid source therefor.

A general object is to provide a device of the character described which is adaptable for providing the intermittent timed and spread discharge of measured quantities of a liquid from a constant supply stream thereof for various useful purposes other than the watering of plants.

The invention possesses other objects and features of advantage, some of which, with the foregoing, will be set forth or be apparent in the following description of a typical embodiment thereof, and in the accompanying drawings, in which, FIGURE 1 is a perspective showing of a unitary assembly embodying the features of the present drip feed device as supportedly mounted on the rim of a receptacle which is arranged to receive liquid for its periodical discharge from a tilt basin of the assembly.

FIGURE 2 is a side elevation of the assembly of FIGURE 1, with certain elements shown in section.

In general terms, the present drip feed assembly is provided on a mounting standard 5 which supports a supply container 6 for the gravity discharge of liquid from its reservoir space 6' into a horizontally extending pipe 7 terminally mounting an adjustable valve 8 to provide a drip discharge of liquid from the reservoir into a tilt basin or tray 9. As illustrated, the basin 9 is tiltably carried on the standard 5 and is disposed above a liquid-receiving plant-growing soil area which is provided by soil S in a receptacle 10 which may comprise a flower pot or the like containing seeds or plants to be periodically watered, with the present standard being particularly shown as mounted on the rim 10' of the receptacle 10 in fixed relation thereto.

As particularly shown, the supply container 6 is of the cylindrical fruit-jar type and is supportable in inverted position on a closure cap 11 threadably and sealably engaging the jar at the tubular neck portion 6" thereof, while the cap is replaceably fixed to the top of the standard 5 in a suitable manner. In the present arrangement, the container-carrying cap is shown as supported on the standard 5 by the use of a clamp band 12 having outwardly-directed and spaced opposed terminal ears 12' thereof connected by a bolt 13 which extends through and between spaced parallel ears 14 provided at the top of the standard, and utilizes a wing nut 13' for facilitating a mounting and dismounting of the water-containing capped jar with respect to a fixed clamped-on relation thereof to the standard. The pipe 7 has one end thereof rigidly attached to one externally threaded arm 15' of an elbow fitting 15 by means of a suitable pipe coupling 16 and extends radially of the container axis, and the other exteriorly threaded arm 15" of the fitting 15 is engaged through an interior opening of the cap top 11' and is suitably held in fixed sealed relation to the cap top 11' at said opening by and between clamp nuts 17' and 17" mounted thereon.

Noting that the arms of the elbow fitting 15 define a plane which is parallel to the upright longitudinal line of the supply container 5, the cap-supported valve-carrying pipe 7 is freely disposable generally horizontally through an upright slot 18 extending in a flat upper portion 5' of the standard 5 from its top and between the support ears 14 to provide for a ready mounting and dismounting of the liquid supply assembly of which it is a part. The drip valve 8 is supportably connected to the pipe 7 by means of the pipe coupling 16, and essentially comprises a generally cylindrical valve body 19 which axially and threadably carries a valve needle 21 having a stem portion extending outwardly from the body in sealed relation thereto and mounting a knurled head 21' for use in adjusting the functional relation of the needle point at its inner end with respect to a valve seat provided in a flow passage provided in the body and connected with the duct of the pipe 7 through the engaged pipe coupling 16 which supportably connects said valve body with the pipe. Intermediately thereof, the valve body 19 is provided with an open discharge passage 22 which extends axially in and along the needle-receiving bore of the body from the valve seat and to the duct of a downwardly-directed discharge nozzle 22' for delivering water from the opened valve 8.

Understanding that the reservoir space 6', which is jointly provided by the cavity of the container 6 and the passages provided by the described connections between the carrying cap 11 and the valve body 19, must be vented to the air in order to permit a discharge of liquid therefrom through the opened valve 8, an air vent tube 23 is provided in connection with the space of the container 6. As particularly shown, the tube 23 extends freely and axially through the space of the arm 15' of the elbow fitting 15 from its sealably mounted engagement in a normally open air inlet port 23' provided in the bend of the fitting, it being understood that the open port 23' is constantly operative for maintaining atmospheric pressure above the liquid remaining in the reservoir space 6' as the water escapes from the drip valve.

When the supply of liquid in the reservoir space 6' is to be renewed, the present liquid supply assembly, comprising the unitarily connected elements between and including the reservoir container 6 and the pipe 7 and drip valve 8 jointly provide a liquid-supply unit which may be readily dismounted from the upper part 5' of the standard 5 by disengaging the bolt 13 from the ears 12' and 14 of the clamp band 12 and the upper standard part 5' respectively, and then moving the pipe 7 of the unit upwardly through and from the slot 18 of the standard.

The dismounted said liquid-supply assembly 6–7–8 may then be disposed with the neck portion 6″ of the container 6 directed upwardly for a removal of the cap 11 therefrom to open the receptacle thereat for receiving a renewing charge of the liquid in the reservoir space 6′. Subsequently, the container 6 and the cap 11 may be sealably reconnected, and thereafter, with the valve 8 preferably fully closed, the reassembled unit is disposed with the cap beneath the container, for its appropriate remounting on the standard 5, or another original support.

The structure of the present tilt basin 9 has a triangular prism outline of uniform cross-section having like parallel triangular ends 26 which are provided with exterior sockets 27 which simultaneously receive coaxial and mutually inturned trunnions 28 extending from the sides 29′ of a generally U-shaped bail-like one-piece member 29 fixedly mounted on the upper standard portion 5′. The member 29 is relatively rigid, and is so mounted on the top standard portion 5′ that the line of the trunnions 28 may be horizontally disposed to define the tilt axis for the basin 9. In the present structure, an intermediate portion 29″ of the element 29 is parallel to the axis of the terminal trunnions 28 and is clampedly fixed to and against the standard top portion 5′ by means of a clamp block 31 mounted on the flat standard part 5′ by a bolt 32 extending transversely therefrom and providing a cross-groove 33 at the face thereof opposite said standard part for clampedly fixing the central portion of the bail part 29′ within said groove and against the opposed face of the engaged standard part; in this manner, the bail is supported in rigidly extended relation from the standard for its adjustment about the fixed axis of the standard-mounted bolt 32 for fixedly disposing the tilt axis of the basin defined by the trunnions 28 in horizontal position independently of the particular fixed disposal of the mounting standard with respect to the vertical.

It will now be noted that the basin 9 has an open upper side and that the opposed closed and angularly related side walls 34 and 35 of the basin are flat and make acute angles at opposite basin sides with a plane through the trunnion axis and substantially bisecting the angle of the sides, with the wall 34 furthest from the supporting standard having its top edge 34′ straight and horizontally disposable whereby a tilting of the filled basin to lower the wall edge 34′ for a spilling of the basin contents thereover will advantageously distribute the discharged liquid in sheet form in a line along the receiving surface of soil S rather than at a single application point. Essentially, the distribution of weight of a basin 9 is such that the basin will be tilted for an emptying of its contents over the top edge 34′ of its side wall 34 only after the liquid in the basin space 9′ has reached a predetermined level substantially at the top of the basin space.

In the illustrated assembly, the sides and ends of the present basin 9 are integral parts of a V-trough basin structure having its ends and sides of uniform thickness and of like material, with its side 35 of less height than its side 34 whereby the latter side is slightly heavier than the former. Also, the present basin mounts a suitable weight element 37 along its bottom edge 36 defined at the juncture of its sides 34 and 35, for stabilizing the position of the basin in neutral equilibrium prior to its tilting for discharging its contents from over the edge 34′ during a basin-emptying swinging movement in which the basin tilts sufficiently to dispose its side 34 in downwardly sloping relation to the bottom basin edge 36 for fully discharging its contents, and then promptly and positively swings back to its original liquid-receiving position.

For mounting the present standard 5 on the tubular rim 10′ of the receptacle 10, a lower standard portion 5″ is provided at its sides with flange portions 38 having edges arranged to engage along the exterior of said rim at circumferentially spaced points thereof, and a clamp strap 39 of adjustable operative length is engageable about the rim and the standard portion 5″ at the position flanges 38 to fix the standard to the rim 10′ as a mounting means for the standard. The present standard 5 is most conveniently arranged to be cut and formed from an initially flat blank comprising a strip of suitable bendable material providing in the upper standard part 5′ the ears 14 and the opening for the bolt 32 which secures the basin-supporting member 29 to the standard.

In order that the present standard 5 may mount the water-supplying unit 25 in such a position that the water-filled tilt basin 9 may discharge onto the soil in the mounting receptacle 10 while the supply container is offset from over the soil area provided within the receptacle, this standard is formed with an appropriate intermediate offset part 5‴ connecting the standard parts 5′ and 5″ and which, in combination with the possibly variable length of the pipe 7 from the container 6 to the nozzle 8, provides for the most advantageous line of discharge of water into the receptacle 10 from the tilted basin 9. It will, of course, be understood that the upper standard portion 5′ of the present standard might be mounted on support legs or might comprise the upper part of a stake for driving into the ground at outdoor locations as comprising an obvious alternate means for mounting the container 6 and the basin support member of the water-supplying unit 25 in cooperative watering relation to plants.

From the foregoing description taken in connection with the accompanying drawings, the advantages of the present drip feed device will be readily understood by those skilled in the art to which the invention appertains. While I have shown and described a structure and operative arrangement which I now consider to comprise a preferred embodiment of my invention, I desire to have it understood that the showings are primarily illustrative, and that such changes and developments may be made, when desired, as fall within the scope of the following claims.

I claim:

1. In a unit for intermittently watering a plant-growing area, the combination with an otherwise closed water-supply container having an underlying closure element sealedly and dismountably carrying the container and providing an interior discharge opening, a variably positionable support standard adapted for its fixed upright disposal adjacent the plant-growing area, an adjustable drip valve, means unitarily connecting the drip valve with the discharge opening of the closure element in fixed relation thereto for a free drip discharge of the water from the valve at an adjusted rate, means removably mounting said valve-carrying closure element on the standard in adjusted relation thereon to provide for an inversion of the dismounted valve and closure unit and a subsequent removal of the closure from the container to provide for a renewal of the water supply in the container and a sealed remounting of the closed container on the standard, means associated with the connection for the drip valve providing an air inlet to the closed container space, a self-righting tilt basin for gravitally receiving successive basin-tilting charges of water from the container through the adjusted drip valve, and means independent of the closure-mounting means mounting the tilt basin on the standard in such adjusted relation to the drip valve that successive tilting actuations of the basin are adapted to gravitationally deliver successive charges of the water from the tilt basin directly upon the plant-growing area.

2. In a water-dispensing unit for intermittently watering a plant-growing area, the combination with a water-supply container providing a discharge opening in its bottom, a rigid supporting standard adapted for its fixed upright disposal adjacent a receiving point for the discharged water, means mounting said container on said standard in fixed relation thereto, an adjustable drip valve, means connecting the drip valve with the discharge opening of the container in fixed relation thereto for a free gravity discharge of the liquid through the valve at an adjusted rate, a bail-carried and self-righting tilt basin disposed beneath the drip valve for gravitationally receiving successive basin-tilting charges of water from the drip valve and providing a straight spill edge for a direct gravity delivery of water thereover upon said plant-growing area, and means adjustable to adjust the basin-carrying bail on the standard for a swinging of the basin about a fixed horizontal axis whereby successive tilting actuations of the basin are adapted to deliver successive charges of the water received by the tilt basin from the drip valve in sheet form and directly upon the plant-growing area.

3. In a unit for intermittently dispensing a liquid in sheet form at a receiving point therefor, the combination with a liquid-supply container having a bottom discharge opening, a support standard adapted for its fixed upright disposal adjacent a receiving point for the discharged liquid, means removably mounting said container on said standard, an adjustable drip valve, means unitarily connecting the drip valve with the discharge opening of the container in fixed relation thereto for a free gravity discharge of the liquid from the valve at an adjusted rate, a bail-carried and self-righting tilt basin for gravitationally receiving successive basin-tilting charges of liquid from the adjusted drip valve and providing a straight and elongated spill edge, means adjustable to adjust the bail of the tilt basin on the standard for horizontally disposing the spill edge of the tilt basin whereby successive tilting actuations of the supported basin are adapted to deliver successive charges of the liquid from the tilt basin over its said spill edge in sheet form to the receiving point for the liquid.

References Cited by the Examiner
UNITED STATES PATENTS

| 1,190,586 | 7/16 | Robertson | 222—481.5 |
| 2,190,459 | 2/40 | Schnebelen | 222—181 X |
| 2,872,898 | 2/59 | Du Mond | 119—72 X |

FOREIGN PATENTS

| 30,203 | 4/10 | Sweden. |

LOUIS J. DEMBO, *Primary Examiner.*

HADD S. LANE, *Examiner.*